Nov. 17, 1959 J. L. WILLIAMS Re. 24,735

BONNETLESS GATE VALVE

Original Filed Oct. 10, 1955

INVENTOR.
JOHN L. WILLIAMS
BY
Buckhorn Cheathom and Blore
ATTORNEYS

United States Patent Office

Re. 24,735

Patented Nov. 17, 1959

24,735

BONNETLESS GATE VALVE

John L. Williams, Oswego, Oreg.

Original No. 2,832,564, dated April 29, 1958, Serial No. 539,539, October 10, 1955. Application for reissue March 26, 1959, Serial No. 802,276

15 Claims. (Cl. 251—326)

Matter enclosed in heavy brackets [ ] appears in the original patent but forms no part of this reissue specification; matter printed in italics indicates the additions made by reissue.

This invention relates to gate valves and particularly to bonnetless gate valves.

A bonnetless gate valve includes a gate blade slidably extending through a packing box into a valve body to fit against a valve seat. In order that the gate blade properly fit against the gate seat, the packing box and the seat must be aligned with one another. Heretofore, alignment of the box and the seat has been obtained by machining them into alignment, or by providing a complicated jig to so hold them while the box is welded in place. Both operations are time consuming and expensive.

In my prior copending application entitled "Stock Valve," Serial No. 248,030, filed September 24, 1951, which has matured into Patent No. 2,720,379, I have disclosed a stock valve having a packing box unit slidably and adustably mounted in the valve body to overcome the abovementioned objections.

It is a main object of the present invention to provide a bonnetless gate valve having an adjustable packing box unit, which gate valve is simpler in construction than my prior valve.

In the valve of the present invention, there is a unique packing box device in which the usual follower or packing gland is eliminated, and the box is inverted and has the packing thereof pressed against the upper edges of the valve body by a box mounting means which provides for adjustment or shifting movement of the box relative to the valve body. Thus, the box may be shifted to a position where a desired alignment is established between the box and the valve seat.

Another object of the invention is to provide a *bonnetless* gate valve which has a considerably simpler packing assembly than prior *bonnetless gate* valves. More specifically, it is an object to provide a *bonnetless* gate valve having a packing box which is separate from the body and which is in an inverted position relative to the position normally occupied by the packing box of a gate valve, which inverted box presses packing against the body and blade to form effective seals therewith.

*It is another important object of the invention to provide a bonnetless gate valve in which the packing assembly, through which the blade extends, includes a gland which is not a specially added part but is provided by an essentially uniform integral continuation of the tubular chest of the body, and in which there is a separate inverted packing box having walls surrounding the gland and pressing packing against said gland.*

Various other objects of the present invention will be apparent from the following description taken in connection with the accompanying drawings, wherein.

Figure 1:
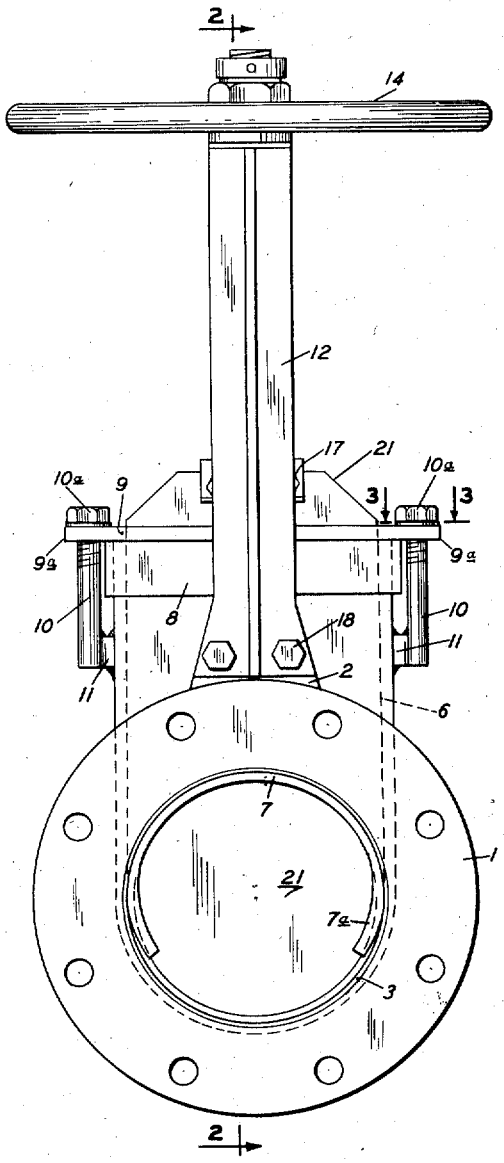
Fig. 1 is an end elevation of a valve embodying the concepts of the present invention.
Figure 2:
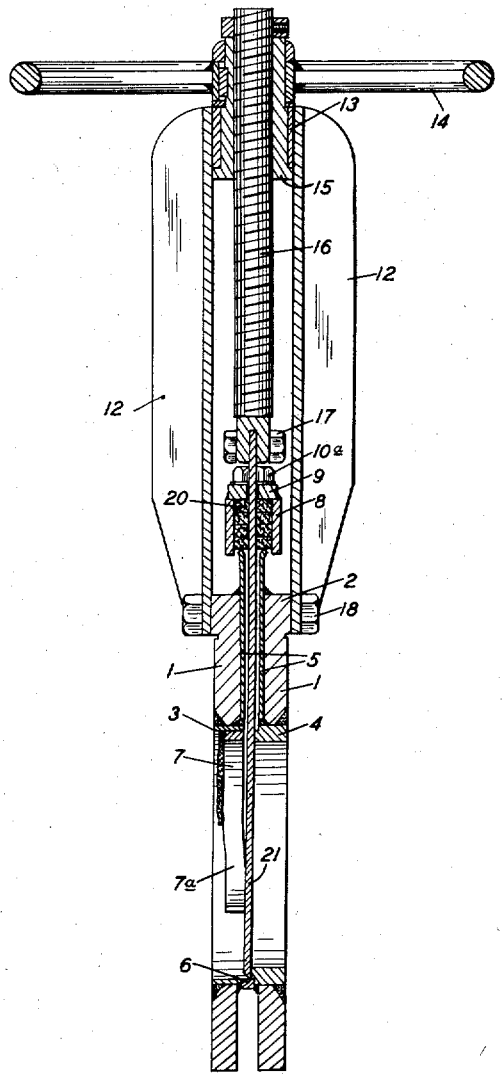
Fig. 2 is a vertical midsectional view through the valve disclosed in Fig. 1.

Referring to the accompanying drawings, the valve includes a pair of annular flanges 1 having a pair of upwardly projecting portions 2 for a purpose to presently appear. A ring 3 is secured within the left-hand flange 1, as the parts are shown in Fig. 2, and a heavier ring 4 is secured within the right-hand flange 1. A pair of valve chest plates 5 are secured on the inner faces of the flanges 1 and have semicircularly recessed lower ends secured to the associated rings 3 and 4. A U-shaped band 6 is secured between the side edges of the valve chest plates 5 and between the lower portions of the rings 3 and 4. *The valve chest plate and the U-shaped band define a gate blade channel.*

A gate blade 21 projects into the *gate blade channel of the* valve body, which valve body may be considered as including the flanges 1, the chest plates 5, the band 6 and the rings 3 and 4. Thte gate blade has the right-hand side surface thereof, as the parts are depicted in Fig. 2, disposed in sliding sealing engagement with a valve seat provided by the ring 4 to control the flow of fluid through the valve. *As shown in Fig. 2, the seat projects into the gate blade channel to space the blade from the valve chest plate closest the seat. It is apparent that the blade is sufficiently thinner than the corresponding dimension of the gate blade channel that the blade is also spaced from the other valve chest plate. This means that a blade may assume various positions within the channel to assure that the blade seats properly against the seat without interference by the chest plates.* The rings 3 and 4 together with the band 6 may be considered as providing a fluid passage through the valve.

An arcuate backing member 7 is secured to the inner surface of ring 3 but has free end portions 7a bent to engage the gate blade 21 and press it against the seat provided by the ring 4. This arcuate backing member forms the subject matter of my application entitled "Stock Valve Having Yieldable Gate Engaging Elements," Serial No. 423,114, filed April 14, 1954, *which has now become abandoned in favor of continuation application entitled "Stock Valve Having Yieldable Gate Engaging Elements," Serial No. 748,030, filed July 11, 1958.*

Surrounding the portion of the gate blade projecting from the valve body is a packing box unit, which includes an inverted box provided by a rectangular loop 8 and a top plate 9. *The loop comprises side walls and end walls.* The box contains packing 20 which is pressed into engagement with the upper edges of the chest portion of the valve body, that is, in engagement with the upper edges of the chest plates 5 and the upper ends of the U-shaped band 6. *It is apparent from the above that plates 5 and the spacer strip on band 6 form a tubular chest, and that the upper margin of this chest provides a packing gland which is an essentially uniform integral continuation of the adjacent chest walls and thus the gland is not a specially added part.* Preferably, the upper margins of the chest plates 5 are bent outwardly, as shown in Fig. 2, and it will be noted that these edges are disposed in spaced relation to the box 8, 9. This provides for lateral shifting movement or adjustment of the box relative to the valve body. The just-mentioned edges may be considered as an upstanding rib surrounding the gate blade. *This rib is spaced from the blade to enable the gate blade to assume a position at which it properly seats against the valve seat without interference by the rib.*

Figure 3:
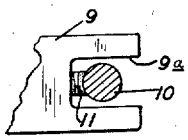
Fig. 3 is a fragmentary view in section taken along lines 3—3 of Fig. 1.

The top plate 9 has end portions projecting outwardly of the valve body and formed with slots 9a through which project studs 10 which are secured at their lower ends by lugs 11 to the valve body. As clearly shown in Fig. 3, there is clearance between the studs 10 and the slots 9a to provide for shifting movement or adjustment of the packing box unit relative to the valve body. Nuts 10a are threaded on the upper ends of the studs 10 and force the packing box unit downwardly to press the packing 20 into engagement with the upper edges of the chest portion of the valve body. *It is apparent that the nuts 10a and the fixed mounting means in the form of the studs 10 provide means whereby when the box is pulled downwardly toward the body to indent the rib into the packing, the box will be held in its adjusted or desired position. The box on one hand and the valve seat and the backing means on the other hand define a line of movement of the blade to insure that the blade will properly seat against the seat during repeated opening and closing movement thereof.*

A pair of arms 12 have their lower ends secured by bolts 18 to the upward projecting portions 2 of the valve flanges 1. The upper ends of the arms 12 are connected together by a yoke hub 13, there being a handwheel 14 having a nut 15 rotatably mounted on the hub 13. A valve stem 16 threadedly extends through the nut 15 and is connected by a clevis and bolt arrangement at 17 to the upper end of the gate blade 21.

With the valve of the present invention, it is unnecessary to be concerned with any critical alignment between a valve seat and a fixed packing box as heretofore has been necessary. When the valve of the present invention is assembled, the nuts 10a are left loose until after the gate blade 21 has been moved to its fully closed position, as shown in Fig. 2, where the fingers 7a press the gate blade into proper tight sealing engagement with the valve seat provided by the ring 4. During this time the packing box unit may freely shift relative to the valve body to bring it to the proper position for the desired fit of the gate blade against the valve seat. Thereafter the nuts 10a may be tightened to maintain this position of the packing box unit. In the event of wear between the gate blade and the valve seat, the nuts 10a may be loosened and the gate blade permitted to assume a tight sealing position against the valve seat whereupon the nuts 10a may again be tightened.

The particular valve shown is ideally suited for handling paper stock. An inexpensive valve for handling corrosive liquids may readily be provided by forming the chest plates 5, the band 6, the rings 3 and 4, the backing member 7 and the gate blade 21 of corrosion resistant metal such as stainless steel. The heavy flanges can be made of mild steel or other noncorrosion resistant metal, and these flanges serve to reinforce the relatively thin but expensive chest plates.

*It is pointed out that the unique packing gland construction of the present invention is suited for gate blades that are loosely received by the body and also blades that are tightly received, since the box may assume the position demanded by the location of the blade. It is pointed out however that when the body loosely receives the blade, the blade may assume a proper seating engagement with the seat without interference by the remaining walls of the body.*

Having described the invention in what is considered to be the preferred embodiment thereof, it is desired that it be understood that the invention is not to be limited other than by the provisions of the following claims.

I claim:

1. A gate valve comprising a valve body having a fluid passage therethrough, a valve seat on the body, a gate blade projecting into the valve body for engagement with said valve seat to control the flow of fluid through said passage, said valve body providing a continuous portion surrounding said gate blade at the place where the gate blade projects from the valve body, a packing box unit surrounding said blade at said place, said packing box unit including a box separate from said body and having a recess facing in the direction of said body and packing in said recess engaging said continuous portion to form a seal therewith, and means providing for adjustment of said box in a direction normal to the plane of said blade to facilitate proper seating of said blade against said valve seat.

2. A gate valve comprising a valve body having a fluid passage therethrough, a valve seat on said body, a gate blade projecting into said body for engagement with said valve seat to control the flow of fluid through said passage, a packing box unit including an inverted box having side walls and an end wall, said end wall having a slot formed therein in spaced relation to said side walls and through which said blade extends, said end wall being disposed remote from said valve body, packing within said box facing said valve body, said valve body having a continuous rib portion surrounding said gate blade at the place where said blade projects from said valve body, and means for forcing said packing box unit toward said valve body to force said packing into engagement with said continuous rib portion, the edges of said packing box adjacent said continuous rib portion being disposed in spaced relation with respect thereto to provide for lateral shifting movement of said box relative to said body to a position wherein a desired alignment is established between said box and the valve seat.

3. A gate valve comprising a valve body having a fluid passage therethrough, a valve seat on said body, a gate blade projecting into said body for engagement with said valve seat to control the flow of fluid through said passage, a packing box unit having an opening through which said blade projects, said packing box unit including an inverted box, packing within said box facing said valve body, said valve body having a continuous rib surrounding said gate blade at the place where said blade projects from said valve body, and means for forcing said packing box unit toward said valve body to force said packing into sealing engagement with said rib, the edges of said packing box adjacent said rib being disposed in spaced relation surrounding said rib to provide for shifting movement of said box relative to said body to a position wherein a desired alignment is established between said box and the valve seat, said means adjustably connecting said packing box to said body to provide for shifting movement of said packing box unit in a direction normal to the direction of movement of said gate blade at a time when said means is in a condition releasing said packing from tight engagement with said rib.

4. A gate valve comprising a valve body having a fluid passageway therethrough, a valve seat in said body, a gate blade for seating against said seat and having a portion projecting from said body, said body providing an upstanding edge around said blade portion, a packing box separate from said body and surrounding said blade portion, packing in said box engaging said edge, and means providing for adjustment of said box in a direction normal to the plane of said blade to facilitate proper seating of said blade against said valve seat.

5. A gate valve comprising a valve body having a fluid passageway therethrough, a gate blade having a portion within said body and a portion projecting from said body, said body providing an upstanding edge around said blade at the place said blade projects from said body, a packing box separate from said body and surrounding said blade, packing carried by said box engaging said edge, and means providing for adjustment of said box and thus the packing carried thereby in a direction normal to the plane of said blade to enable said blade to be arranged in a predetermined relation with respect to said valve body.

6. A gate valve comprising a valve body having a flow passage, a valve seat in said body, a gate blade for seating against said seat and having a portion projecting from said body, an inverted packing box separate from said body and surrounding said blade at the place it projects from said body, packing carried by said box and engaging said body in surrounding relation to said blade at said place, and means providing for adjustment of said box and thus the packing carried thereby in a direction normal to the plane of said blade to facilitate proper seating of said blade against said valve seat.

7. A gate valve comprising a valve body having a fluid passage therethrough, a gate blade having a portion within said body and a portion projecting from said body, an inverted packing box separate from said body and surrounding said blade at the place said blade projects from said body, packing carried by said box and engaging said body in surrounding relation to said blade at said place, and means providing for adjustment of said box and thus the packing carried thereby in a direction normal to the plane of said blade to enable said blade to be arranged in a predetermined position relative to said valve body.

8. A gate valve comprising a valve body having a fluid passage therethrough including a valve seat, a gate blade projecting into the valve body engageable with said seat to control the flow of fluid through said passage, said valve body providing a continuous upstanding rib surrounding said gate blade at the place where the blade projects from said valve body, an inverted packing box separate from said body and surrounding said blade at the place said blade projects from said body, said box having side walls and end walls and a top wall, said side and end walls being dimensioned to provide a lower margin overlapping the rib, said top wall being remote from said body and having a slot through which said blade extends, said side and end walls being spaced from said blade to provide a packing recess, and packing occupying said recess and surrounding said blade and engaging said rib, and means for forcing said box and its packing toward said body to effect a seal between said packing and said rib.

*9. A bonnetless gate valve comprising a body having a flow passage formed therethrough, said body being formed with a gate blade channel of narrow elongate cross section intersecting said flow passage, a valve seat on said body, a gate blade having a portion in said channel and a portion projecting from said channel exteriorly of said body, said blade being seated against said seat, said seat projecting into said channel to space said blade from the wall of said channel adjacent said seat, said blade having a thickness sufficiently less than the corresponding dimension of said channel that the blade is also spaced from the opposite wall of said channel so that said blade may seat against said seat and may assume various positions within said channel without interference by the walls of said channel, backing means for urging said blade into engagement with said seat, arms fixedly connected to said body and extending away therefrom, operating means on the ends of said arms remote from said body and connected to said blade for moving said blade between open and closed positions with respect to said flow passage, the upper end of said channel being defined by a rib to serve as a packing gland, said packing gland rib surrounding said blade in spaced relation thereto at least in a direction normal to the plane of said blade, an inverted packing box separate from said body, said box being of elongate form and surrounding said blade, said box having side and end walls and a top wall remote from said body, said side and end walls forming a loop greater than that formed by said packing gland rib and extending toward said body an extent to overlap said packing gland rib, the loop of said box side and end walls being sufficiently larger than the loop of the packing gland rib that at least the side walls of said box are disposed in spaced relation with respect to said rib, said top wall having a slot through which said blade extends, said side and end walls being spaced from said blade to provide a packing recess, packing surrounding said blade, said packing being compressed within said recess against said blade and the inner surfaces of said box so that with respect to the box and blade, the lateral position of each is determined by the location of the other, threaded elements fixedly secured to said body and projecting upwardly therefrom and extending loosely through oversize openings in portions of said box to provide for adjustment of said blade and said box relative to said body in a direction normal to said blade, said seat and backing means on one hand and said box on the other providing spaced guide means for said blade to establish the line of movement of said blade so that by properly locating said box, said blade will properly seat against said seat, and means for maintaining an adjusted position of said box comprising nuts threaded on the upper ends of said threaded elements to engage said box to force said box toward said body and cause said packing gland rib to indent into said packing to hold said box in its adjusted position.*

*10. A bonnetless gate valve comprising a body having a flow passage formed therethrough, said body being formed with a gate blade channel of narrow elongate cross section intersecting said flow passage, said body including inlet and outlet plates separated by a spacer strip at certain of their edges to at least in part define said channel, a valve seat in said body, a gate blade having a portion in said channel and a portion projecting from said channel exteriorly of said body, said blade being seated against said seat, said seat projecting into said channel to space said blade from the wall of said channel adjacent said seat, said blade having a thickness sufficiently less than the corresponding dimension of said channel that the blade is also spaced from the opposite wall of said channel so that said blade may seat against said seat and may assume various positions within said channel without interference by the walls of said channel, backing means for urging said blade into engagement with said seat, arms fixedly connected to said body and extending away therefrom, operating means on the ends of said arms remote from said body and connected to said blade for moving said blade between open and closed positions with respect to said flow passage, the end portions of said inlet and outlet plates and spacer strip which are in the form of a loop serving as a packing gland, said packing gland surrounding said blade in spaced relation thereto at least in a direction normal to the plane of said blade, an inverted packing box separate from said body, said box being of elongate form and surrounding said blade, said box having side and end walls and a top wall remote from said body, said side and end walls forming a loop greater than that formed by said packing gland and extending toward said body an extent to overlap said packing gland, the loop of said box side and end walls being sufficiently larger than the loop of the packing gland so that at least the side walls of said box are disposed in spaced relation with respect to said packing gland, said top wall having a slot through which said blade extends, said side and end walls being spaced from said blade to provide a packing recess, packing surrounding said blade, said packing being compressed within said recess against said blade and the inner surfaces of said box so that with respect to the box and blade, the lateral position of each is determined by the location of the other, threaded elements fixedly secured to said body and projecting upwardly therefrom and extending loosely through oversize openings in portions of said box to provide for adjustment of said blade and said box relative to said body in a direction normal to said blade, said seat and backing means on one hand and said box on the other providing spaced guide means for said blade to establish the line of movement of said blade so that by properly locating said box, said blade will properly seat against said seat, and means for maintaining an adjusted position of said box comprising nuts threaded on the upper ends of said threaded elements to engage said box to force said box toward said body and cause said*

*packing gland to indent into said packing to hold said box in its adjusted position.*

*11. A bonnetless gate valve comprising a body having a flow passage formed therethrough, said body being formed with a gate blade channel of narrow elongate cross section intersecting said flow passage, a valve seat on said body, a gate blade having a portion in said channel and a portion projecting from said channel exteriorly of said body, said blade being seated against said seat, said seat projecting into said channel to space said blade from the wall of said channel adjacent said seat, said blade having a thickness sufficiently less than the corresponding dimension of said channel that the blade is also spaced from the opposite wall of said channel so that said blade may seat against said seat and may assume various positions within said channel without interference by the walls of said channel, means connected to said blade for moving said blade between open and closed positions with respect to said flow passage, the upper end of said channel being defined by a rib which is in the form of a loop to serve as a packing gland, said packing gland rib surrounding said blade in spaced relation thereto at least in a direction normal to the plane of said blade, an inverted packing box separate from said body, said box being of elongate form and surrounding said blade, said box having side and end walls and a top wall remote from said body, said side and end walls forming a loop greater than that formed by said packing gland rib and extending toward said body to such an extent to overlap said packing gland rib, the loop of said box side and end walls being sufficiently larger than the loop of the packing gland rib that at least the side walls of said box are disposed in spaced relation with respect to said rib, said top wall having a slot through which said blade extends, said side and end walls being spaced from said blade to provide a packing recess, packing surrounding said blade, said packing being compressed within said recess against said blade and the inner surfaces of said box so that with respect to the box and blade, the lateral position of each is determined by the location of the other, means connecting said box and body and providing for adjustment of said blade and box relative to said body in a direction normal to said blade and maintaining an adjusted position of said box by forcing said box toward said body and causing said packing gland rib to indent into said packing to hold said box in its adjusted position.*

*12. A bonnetless gate valve comprising a body having a flow passage formed therethrough, said body having a tubular chest of elongate cross section providing a gate blade channel intersecting said flow passage and having a mouth remote from said flow passage, a valve seat in said body, a gate blade having a portion in said channel and a portion projecting from the mouth of said channel exteriorly of said body, said blade being seated against said seat, said seat projecting into said channel to space said blade from the wall of said channel adjacent said seat, said blade having a thickness sufficiently less than the corresponding dimension of said channel that the blade is also spaced from the opposite wall of said channel so that said blade may seat against said seat and may assume various positions within said channel without interference by the walls of said channel, means connected to said blade for moving said blade between open and closed positions with respect to said flow passage, backing means for urging said blade into engagement with said seat, said tubular chest being of generally uniform cross section from said flow passage to said mouth, the margin of said chest defining said mouth providing a rib which is an integral essentially uniform continuation of the adjacent portions of the chest, said rib being in the form of a loop and serving as a packing gland, said packing gland surrounding said blade in spaced relation thereto at least in a direction normal to the plane of said blade, an inverted packing box separate from said body, said box being of elongate form and surrounding said blade, said box having side and end walls and a top wall remote from said body, said side and end walls forming a loop greater than that formed by said packing gland and extending toward said body an extent to overlap said packing gland, the loop of said box side and end walls being sufficiently larger than the loop of the packing gland that at least the side walls of said box are disposed in spaced relation with respect to said packing gland, said top wall having a slot through which said blade extends, said side and end walls being spaced from said blade to provide a packing recess, packing surrounding said blade, said packing being compressed within said recess against said blade and the inner surfaces of said box so that with respect to the box and blade, the lateral position of each is determined by the location of the other, means connecting said box and body and providing for adjustment of said blade and box relative to said body in a direction normal to said blade and forcing said box toward said body and causing said packing gland to indent into said packing.*

*13. In a bonnetless gate valve, a body having a fluid flow passage intersecting a blade channel, a gate blade loosely extending into said channel and engaging a seat projecting into said channel, a rib on said body surrounding said blade, a packing box separate from said body and having packing surrounding said blade and engaging said rib, certain walls of said box loosely surrounding said rib and said rib being spaced from said blade so that said box and blade may be located in different lateral positions relative to said body to facilitate proper seating of said blade against said seat, and means connecting said box and body for maintaining a desired location of said box and pulling said box toward said body to compress said packing against said rib to force said packing against said blade so that the packing forms fluid seals with both said rib and said blade.*

*14. In a bonnetless gate valve, a body having a fluid flow passage intersecting a gate blade channel, a gate blade loosely extending into said channel and engaging a seat projecting into said channel, a rib on said body surrounding said blade, a packing box separate from said body and having packing surrounding said blade and engaging said rib, certain walls of said box loosely surrounding said rib and said rib being spaced from said blade so that said box and blade may be located in different lateral positions relative to said body to facilitate proper seating of said blade against said seat, fixed box mounting means on said body, releasable connecting means for selectively immovably conecting said box and said fixed mounting means in various lateral positions of said box relative to said body to enable said box to be located laterally relative to said body in a position at which said blade properly seats against said seat and to be maintained in such position, said releasable connecting means being operable to pull said box toward said body to compress said packing against said rib to force said packing against said blade so that the packing forms fluid seals with both said ribs and said blade.*

*15. A bonnetless gate valve comprising a valve body including spaced body plates in part defining a gate blade channel which intersects a flow passage in said body, bolting flanges secured to the outer faces of said body plates, said plates being thin as compared to said flanges and projecting beyond said flanges in a predetermined direction, a gate blade movably received between said body plates and projecting beyond said plates in said direction, an inverted packing box separate from said body and surrounding said blade and having side walls and end walls and a top wall which is remote from said body and through which said blade extends, said side walls and end walls extending toward said body in overlapping relation with the outer surfaces of the projecting portions of said body plates, packing in said box engaging the edges of the projecting portions of said body plates whereby said*

*plates function as packing gland portions, fixed box mounting means on said body, releasable connecting means for selectively immovably connecting said box and said fixed mounting means in various lateral positions of said box relative to said body to enable said box to be located laterally relative to said body in a position at which said properly seats against said seat to be maintained in such position, said connecting means being operable for pulling said box toward said body to compress said packing against said packing gland portions and said blade, arms fixedly secured to said bolting flanges*

*and projecting away therefrom in said direction, operating means on the remote ends of said arms and connected to said blade for moving the same.*

References Cited in the file of this patent or the original patent

UNITED STATES PATENTS

| | | |
|---|---|---|
| 2,064,567 | Riley | Dec. 15, 1936 |
| 2,669,416 | Hilton | Feb. 16, 1954 |
| 2,720,379 | Williams | Oct. 11, 1955 |